Sept. 20, 1971  C. A. GLENN  3,605,521

INDEXING HANDLE FOR A TOOL

Filed March 26, 1970

INVENTOR
CHARLES A. GLENN

BY

FISHMAN & VAN KIRK
ATTORNEYS 3,605,521
INDEXING HANDLE FOR A TOOL
Charles A. Glenn, 92 Four Mile Road,
West Hartford, Conn. 06107
Filed Mar. 26, 1970, Ser. No. 22,971
Int. Cl. G05g 1/04
U.S. Cl. 74—548                                    10 Claims

ABSTRACT OF THE DISCLOSURE

A tool handle capable of being indexed while mounted on a machine tool. The handle may be mounted to machines such as drill presses or milling machines which have a quill that is advanced manually by rotation of the handle. The handle includes a hub which is manually rotated and a sleeve which is mounted to a rotatable control shaft in the machine. The sleeve and hub have mating splines and may be axially displaced with respect to one another to disengage the splines. When the splines are disengaged, the hub can be rotated to a new position with respect to the sleeve and the splines can be reengaged. A spring normally urges the hub into the axial position at which the splines are engaged for transmitting torque from the hub to the sleeve and the control shaft of the machine.

BACKGROUND OF THE INVENTION

(1) Field of the invention

This invention relates to the field of machine tools. More particularly, the invention relates to manual control handles which are employed on machine tools to control a machining operation. Accordingly, the general objects of the present invention are to provide a novel and improved tool handle.

(2) Description of the prior art

Numerous machine tools, such as milling machines and drill presses, include a quill portion which carries a cutting tool. The quill generally advances slowly with the cutting tool or may be held fixedly at a selected position as material is removed.

The quill portions of the machine tools are often advanced manually by means of a control handle coupled to the quill through a mechanical mechanism such as a rack and pinion gear. The rack would be attached to the quill and the pinion gear is connected to a control shaft rotated by the handle. The handle is in turn grasped by the machine operator and rotated to locate the cutting tool prior to or during the machining operation.

It is frequently desirable to index the control handle on the machine shaft so that the handle can be relocated at a selected attitude with respect to the machine regardless of the position of the quill. Different set ups, that is physical relationships of the workpiece, cutting tool and quill with respect to the housing of the machine, may vary the attitude of the control handle considerably. If the handle can be adjusted with respect to the shaft upon which it is mounted, the operator can locate the handle at a desired position suitable for the required throw of the handle and ease of operation.

Adjustable control handles are already known in the prior art. One of these handles employs a rotatable hub on a sleeve fixed to the machine shaft. The hub and sleeve are coupled together by means of an offset, axially extending dowel which is mounted in the hub and engages one of a plurality of dowel-receiving apertures in a sleeve flange. To index the hub with respect to the sleeve, the hub is translated axially, which disengages the dowel, and rotated until the dowel can be aligned with a different aperture providing the approximate attitude of the handle desired by the operator.

The prior art handles have a tendency to pull off of the sleeve entirely even though detent mechanisms are provided to retain the hub on the shaft while it is being indexed. Furthermore, the physical size of the dowel and the dowel-receiving apertures generally limits the adjustment to nine or ten index positions. The spacing between the various index positions is fairly large and restricts the degree of adjustment which can be made in the attitude of the handle.

Accordingly, it is an object of the present invention to disclose a tool handle which can be easily indexed between various positions with respect to a machine tool.

It is a further object of the present invention to disclose a tool handle which offers a significant increase in the selection of index positions on the machine tool.

It is still a further object of the present invention to disclose a tool handle which remains securely fastened to the machine tool while it is indexed between various positions with respect to the machine tool.

It is still a further object of the present invention to disclose a tool handle which is securely fastened to a manually rotatable shaft of a machine tool during a machining process and which is easily indexed between various positions with respect to the machine tool when the operator so desires.

SUMMARY OF THE INVENTION

This invention relates to the field of machining tools and more particularly to manually operable handles which are capable of being indexed on a control shaft of the machine.

The handle comprises a manually rotatable hub which is coupled for transmitting torque by means of splines to a sleeve. The sleeve in turn is keyed to the control shaft of the machine tool and, therefore, rotation of the hub results in rotation of the shaft.

The hub is mounted on the sleeve to slide axially so that the mating splines between the sleeve and the hub can be disengaged and the hub can be indexed with respect to the sleeve and control shaft. A spring normally urges the mating splines into engagement. When it is desired to index the hub with respect to the sleeve, the machine operator manually slides the hub axially out of engagement with the sleeve and rotates the hub to a new, desired relationship with respect to the control shaft of the machine.

The hub and sleeve maintain their co-axial relationship with respect to one another by means of cylindrical aligning surfaces which are preferably disposed at axially separated stations on opposite sides of the splines. The spring which urges the splines into engagement is a coil spring sandwiched between confronting shoulders on the hub and sleeve. The hub and sleeve are limited in their axial displacement with respect to one another in one direction by the compression of the spring between the shoulders or contact of the splines with a flange and in the other direction by a bushing which is press fitted onto the sleeve after the hub has been mounted. The bushing serves to maintain the hub, sleeve and spring in an assembled unit which can be readily mounted to a number of machine tools.

The hub may be provided with a knurled gripping portion so that it can be readily grasped by the machine operator for either rotational or axial movement. In a preferred form of the invention, the hub is provided with a lever arm which permits the machine operator to apply torque to the control shaft of the machine without undue strain.

BRIEF DESCRIPTION OF THE DRAWINGS

The present invention may be better understood and its numerous advantages will become more apparent to those skilled in the art by reference to the accompanying drawing wherein like reference numerals refer to like elements in the various figures.

DESCRIPTION OF THE PREFERRED EMBODIMENTS

Figure 1:
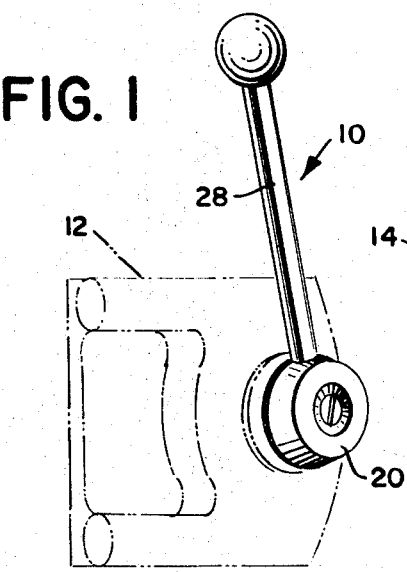
FIG. 1 is an isometric view of the tool handle mounted at the side of a machine tool housing shown in phantom.

Reference to FIG. 1 discloses the tool handle, generally designated by the numeral 10, mounted at the side of a housing 12 of a machine tool. Such a tool may be any machine tool which employs a manually operated handle to control the machine functions. For example, the housing 12 may be that of a milling machine or a drill press which translates a quill having a rotating cutting tool, a milling wheel or a twist drill respectively. As the machining process takes place, the quill must be advanced with the cutting tool at the initiation of the cutting process and possibly during the cutting process as well. The quill may be translated by means of a gear rack secured to the quill and a pinion gear engaging the rack and rotated by a control shaft. The tool handle 10 would then be attached to the control shaft.

Figure 2:
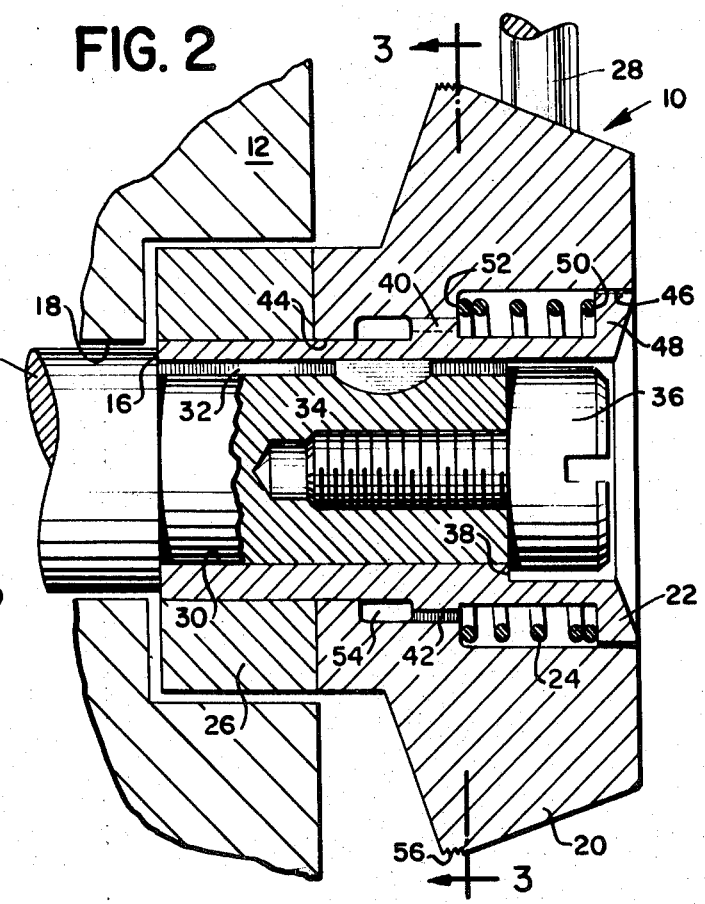
FIG. 2 is an enlarged sectional view of the tool handle as mounted on the machine tool in FIG. 1.

Reference to the enlarged sectional view in FIG. 2 discloses the detailed structural elements of the tool handle 10. The machine housing 12 supports a control shaft 14 by means of journal bearings (not shown). The control shaft 14 would be connected to the pinion gear which drives the rack on the tool supporting quill as described above. The shaft 14 has a stepped diameter which forms a shoulder 16 immediately adjacent the aperture 18 in housing 12 through which the control shaft 14 projects. It will be understood that the housing 12 and the shaft 14 are parts of the machine tool and form no part of the present invention. It will also be noted that the shaft 14 projects into a cavity formed at the exterior of housing 17; however, the shaft could equally as well have projected through a flush surface or a boss on the housing without effecting the utility or purpose of the novel tool handle 10.

The tool handle 10 is comprised generally of a manually rotatable hub 20, a sleeve 22 and a coil spring 24. In addition, a retaining bushing 26 is press fitted to the sleeve 22 at one side of hub 20 and a lever arm 28, seen more clearly in FIG. 1, is secured to the hub 20.

The sleeve 22 includes a cylindrical mounting surface 30 which fits closely with the outer cylindrical surface of shaft 14 to maintain precise alignment with the shaft without excessive play. The cylindrical surface 30 includes a keyway 32. A key 34 supported in the shaft 14 locks the sleeve 22 rotationally with the shaft 14. The sleeve 22 is prevented from shifting axially on shaft 14 by abutment at one end of the sleeve 22 with the shaft shoulder 16 and at the other end by means of a capscrew 36 which engages shoulder 38 adjacent the mounting surface 30 of the sleeve 22.

It will be readily understood from the above that the handle 10 is mounted to the shaft 14 by means of the sleeve 22. Installation of the handle 10 is easily accomplished simply by sliding the sleeve 22 over shaft 14 with the key 34 in keyway 32 and securing the sleeve in position on the shaft by means of the capscrew 36. Removal of the handle 10 is accomplished by removing the screw 36 and sliding the handle 10 off of the shaft 14.

One of the principal features of the novel handle 10 is the capability of indexing the manually rotatable hub 20 with respect to the control shaft 14 so that the particular machining operation can be accomplished with the handle in the most convenient manner possible. Considerations which would induce the machine operator to make such adjustments are the throw of the handle required for a given machining operation and the initial and the final positions of the handle with respect to the machine.

Figure 3:
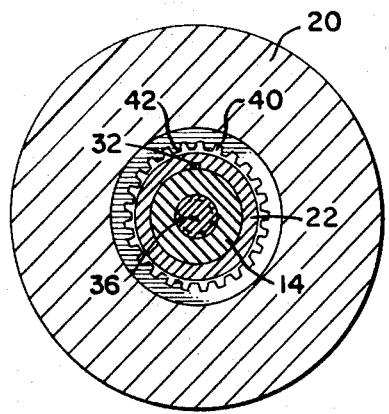
FIG. 3 is a cross-sectional view of the tool handle as seen along the section line 3—3 in FIG. 2.

In order to provide the indexing feature, the sleeve 22 as seen in FIGS. 2 and 3 bears splines 40 which engage mating splines 42 carried by the hub 20. When the splines 40 and 42 are engaged, the hub 20 can be used to apply a torque to the shaft 14 through sleeve 22. The hub 20 is also slidable axially on the shaft 22 and maintains its coaxial position on the sleeve 22 by means of the cylindrical aligning surfaces 44 and 46. These aligning surfaces slide over the mating surfaces on the sleeve 22 as the hub 20 is translated axially. It will be noted that the surface 46 is spaced slightly in FIG. 2 from the mating surface on the flange 48 because of the close-fitting splines 40 and 42 are engaged and also provide a certain amount of alignment. The small spacing at surface 46 accommodates machining tolerances which may incrementally offset surfaces 44 and 46 from a perfectly co-axial relationship with splines 40 and 42. When the splines 40 and 42 are disengaged the hub 20 is guided on the sleeve 22 by means of surfaces 44 and 46. The surfaces 44 and 46 are separated axially from one another by the greatest possible distance to provide the broadest possible supporting foundation for the hub 20.

The flange 48 on sleeve 22 forms a shoulder 50 which confronts with a shoulder 52 adjacent the splines 42 in the central bore of hub 20. The confronting shoulders 50 and 52 lie at the ends of an annular chamber in which the coil spring 24 is located. The shoulders 50 and 52 provide the reacting surfaces for the coil spring 24. The axial length of spring 24 is selected to slightly compress the spring 24 between the shoulders while the splines 40 and 42 are engaged.

The bushing 26 is pressed onto the sleeve 22 and forms an abutment against which the hub 20 rests while the splines are engaged. The slight compression of spring 24 urges the hub 20 into abutment with bushing 26 and accordingly holds the splines in engagement.

Figure 4:
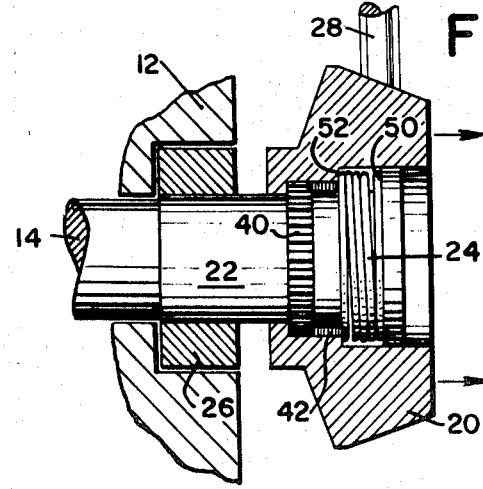
FIG. 4 is a sectional view of the tool handle while the hub is being indexed from one position to another with respect to the control shaft of the machine tool.

An annular chamber 54 is formed between the splines 40 and 42 and the cylindrical alignment surface 44 when the hub 20 abuts bushing 26. The axial length of the chamber 54 is slightly longer than the axial length of splines 40 on sleeve 22. As a consequence, the machine operator may grasp the hub 20 and pull it axially away from the housing 12 until the splines 40 and 42 are disengaged from one another as shown in FIG. 4. The displacement of shoulders 50 and 52 toward one another during the axial displacement of hub 20 also compresses spring 24.

The arrows in FIG. 4 indicate the axial direction in which hub 20 has been pulled by the machine operator to disengage the splines 40 and 42. In this disengaged position, the hub can be rotated with respect to the sleeve 22 and shaft 14 to the new position desired by the operator. Upon reaching the new position, the operator releases the hub 20 and the compressed spring 24 urges the hub 20 and sleeve 22 back into engagement through splines 40 and 42. If the splines are misaligned and will not immediately engage, a slight rotation by the operator in one direction or the other will result in the hub snapping into engagement with the sleeve due to the urging of spring 24. A slight chamfer on the end surfaces of the splines will greatly facilitate their engagement.

To aid the operator in gripping the hub 20, the hub 20 includes a narrow gripping portion 56 which extends circumferentially around the hub 20 at the largest diameter of the hub 20. The portion 56 is knurled on the periphery and is also axially displaced away from the housing 12 so that the operator's fingers can readily grip the knurling without interference with the housing 12.

It will be readily understood that the novel tool handle 10 can be readily installed on any quill-type machine tools. The handle 10 simply slides onto the shaft and screw 36 holds the handle 10 in place. The indexing of the handle 10 between various index positions on the machine is accomplished simply by axially sliding the hub 20 on sleeve 22 and rotating the hub 20 until the desired index position is reached. The coil spring 24 automatically holds the hub and sleeve locked to transmit torque applied by the operator to the machine control shaft 14. The handle 10 is always secured to the machine so that it cannot come off in the operator's hand when he indexes the handle. Furthermore, the splines 40 and 42 provide a larger number of index positions than is possible in the prior art handles employing dowels and receiving apertures in the hub and sleeve. The handle 10 in one embodiment has as many as forty-eight teeth in the splines 40 and 42 which provide forty-eight different index positions. The handle 10, therefore, can provide approximately five times as many index positions as handles found in the prior art.

While the tool handle 10 has been described in several embodiments, it will be understood that various modifications and substitutions can be made to the handle without departing from the novel features incorporated in the various embodiments. For example, while the hub 20 has been provided with a lever arm 28 to facilitate manual rotation of the hub 20, it is feasible and contemplated by the present invention that other grasping devices may be incorporated with the hub 20 such as a fluted circumference which may be grasped with the operator's fingers. It will be recognized that the axial positions of the aligning surfaces 44 and 46, the splines 40 and 42 and the shoulders 50 and 52 which engage spring 24 can be interchanged without destroying the essential purpose of the handle 10. While the sleeve 22 is keyed to shaft 14, other devices for fixedly securing the sleeve to the shaft, such as a set screw engaging a flat on the shaft 14, will be recognized by those skilled in the art. The bushing 26 is press fitted onto sleeve 22 to form the abutment against which the hub 20 normally rests; however, other abutments may be formed by threaded bushings or lock nuts and washers without destroying the utility of the device. It will, therefore, be recognized that the novel tool handle has been described by way of illustration and not by way of limitation.

What is claimed is:

1. A tool handle capable of being indexed comprising:
   a sleeve member having a first set of splines projecting from a cylindrical surface of the member at one axial station on the member;
   a manually rotatable hub member slidably and coaxially mounted on the sleeve member and including a second set of splines engaging the first set of splines on the sleeve member at a first axial position of the hub member on the sleeve member and disengaged from the first set of splines at a second axial position of the hub member on the sleeve member, the hub member being axially slidable on the sleeve member between the first and the second axial positions; and
   resilient means interposed between the hub member and the sleeve member for urging the hub member into the first axial position on the sleeve member whereby the two members are rotatably coupled together through the first and second sets of splines.

2. The handle of claim 1 wherein:
   the hub member is mounted externally on the cylindrical surface of the sleeve and includes an internal bore, the cylindrical surface and the bore having confronting shoulders; and
   the resilient means is a coil spring extending between the confronting shoulders of the surface and the bore.

3. The handle of claim 2 wherein:
   the shoulder on the sleeve is formed by a flange at one end of the sleeve; and
   the shoulder in the bore is adjacent the second set of splines.

4. The handle of claim 2 wherein:
   the shoulder on the sleeve is formed by a flange adjacent the second position of the hub member on the sleeve member; and
   abutment means are secured externally on the sleeve member adjacent the first position of the hub member to limit the displacement of the hub member between the first and second positions.

5. The handle of claim 4 wherein: the butment means is a bushing pressed onto the sleeve adjacent the first position of the hub member.

6. The handle of claim 1 wherein: the hub member includes a knurled gripping portion for gripping the hub member manually.

7. The handle of claim 1 wherein: a lever arm is connected to the hub member for manually rotating the member.

8. The handle of claim 1 wherein: the hub member and the sleeve member include first and second pairs of mating cylindrical alignment surfaces disposed at axial stations on opposite sides of the mating splines.

9. The handle of claim 8 wherein: the resilient means is a coil spring circumscribing the sleeve member and interposed between the splines and one of the pairs of alignment surfaces.

10. The handle of claim 1 wherein: the sleeve member includes an internal cylindrical mounting surface having a keyway extending axially along the mounting surface.

References Cited

UNITED STATES PATENTS

| | | | |
|---|---|---|---|
| 2,829,538 | 4/1958 | Mueller | 74—548 |
| 2,899,841 | 8/1959 | Melloy | 74—548 |

WILLIAM F. O'DEA, Primary Examiner

F. D. SHOEMAKER, Assistant Examiner

U.S. Cl. X.R.

77—34.6